US008880730B2

(12) United States Patent
Hebert et al.

(10) Patent No.: US 8,880,730 B2
(45) Date of Patent: Nov. 4, 2014

(54) METHOD AND SYSTEM FOR MANAGING DESTINATION ADDRESSES

(75) Inventors: Patrice Hebert, Anjou (CA); Manuel Laflamme, Brossard (CA); Jean Regnier, Laval (CA); Gaetan Vachon, Verdun (CA); Joerg Christof Zender, Renton, WA (US)

(73) Assignee: Synchronica plc, Kent (GB)

( * ) Notice: Subject to any disclaimer, the term of this patent is extended or adjusted under 35 U.S.C. 154(b) by 1292 days.

(21) Appl. No.: 11/356,462

(22) Filed: Feb. 16, 2006

(65) Prior Publication Data
US 2007/0055742 A1 Mar. 8, 2007

Related U.S. Application Data

(60) Provisional application No. 60/653,127, filed on Feb. 16, 2005.

(51) Int. Cl.
*G06F 15/16* (2006.01)

(52) U.S. Cl.
USPC ........... 709/245; 709/206; 709/214; 709/224; 455/466; 455/556.1

(58) Field of Classification Search
USPC .................................................. 709/214, 245
See application file for complete search history.

(56) References Cited

U.S. PATENT DOCUMENTS 6,286,047 B1 * 9/2001 Ramanathan et al. ........ 709/224
6,654,790 B2 11/2003 Ogle et al.
6,714,793 B1 3/2004 Carey et al.

(Continued)

FOREIGN PATENT DOCUMENTS

EP 0 944 004 9/1999
EP 1 236 318 9/2002

OTHER PUBLICATIONS

Oikarinen, J. et al., Network Working Group, Internet Relay Chat Protocol, 1993, Request for Comments: 1459, pp. 1-65.

(Continued)

*Primary Examiner* — Yves Dalencourt
(74) *Attorney, Agent, or Firm* — Soquel Group LLC

(57) ABSTRACT

A method for downloading destination addresses associated with a given client device from a server to the client device is disclosed. The method comprises the steps of determining a resource limitation of the client device, sorting the addresses, and transmitting a subset of the sorted addresses from the server to the device, wherein the transmitted sorted address subset is determined by the resource limitation.

There is also provided a system and server for supporting Instant Messaging (IM). The system comprises a telecommunications network interconnecting a plurality of IM clients and an IM server, the plurality of IM clients configured to exchange instant messages with one another via the telecommunications network and the IM server, each of the IM clients having an associated IM address, the IM server comprising a memory for storing a plurality of IM addresses, a set of the IM addresses corresponding to each of the IM clients and wherein a given set comprises at least one IM address other than an IM address of the IM client to which the given set corresponds, wherein on occurrence of a triggering event associated with a particular IM client the IM server selects a subset of the IM addresses from the set of addresses corresponding to the particular IM client based on a resource limitation of the particular IM client and transmits the selected IM address subset to the particular IM client.

36 Claims, 3 Drawing Sheets

(56) References Cited

U.S. PATENT DOCUMENTS

| | | |
|---|---|---|
| 6,757,722 B2 | 6/2004 | Lonnfors et al. |
| 6,785,681 B2 | 8/2004 | Keskar et al. |
| 6,941,149 B2 * | 9/2005 | Smith et al. ............... 455/466 |
| 6,970,553 B1 | 11/2005 | Gao et al. |
| 6,981,023 B1 | 12/2005 | Hamilton et al. |
| 7,548,756 B2 * | 6/2009 | Velthuis et al. ............ 455/466 |
| 7,657,598 B2 * | 2/2010 | Daniell et al. ............. 709/206 |
| 2001/0034244 A1 * | 10/2001 | Calder et al. .............. 455/556 |
| 2004/0234603 A1 | 11/2004 | Baum et al. |
| 2004/0267887 A1 * | 12/2004 | Berger et al. ............... 709/206 |
| 2006/0101119 A1 * | 5/2006 | Qureshi et al. ............. 709/206 |
| 2006/0179114 A1 * | 8/2006 | Deeds ........................ 709/206 |

OTHER PUBLICATIONS

Parviainen, R. et al., Mobile Instant Messaging, 2003, pp. 425-430.

Ericsson, Motorola and Nokia, The Wireless Village Initiative, 2001-2002, pp. 1-12.

\* cited by examiner

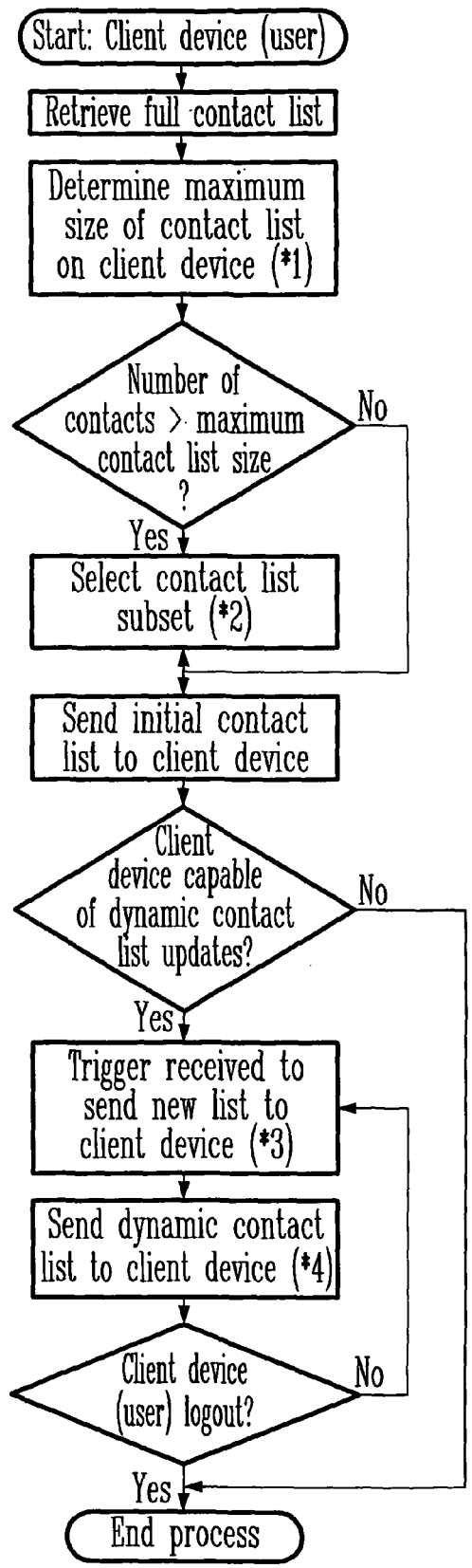

*1) This can be determined by the type of transport (bearer) or the client device memory capabilities

*2) E.g. online contacts selected first, then mobile, busy, away and offline. If online contacts are more than a maximum size, the list is truncated

*3) The trigger may be one of e.g.: manual request from the client device through "ListManage", presence update with "GetPresence" or "PresenceNotification"

*4) "In conversation" contacts selected first, then online, mobile, busy, away and offline. If online contacts are more than maximum size, the list is truncated. If a contact is added during a session, it will also be added to the dynamic contact list.

FIG. 3

METHOD AND SYSTEM FOR MANAGING DESTINATION ADDRESSES

The present application claims priority from U.S. Patent Application No. 60/653,127 filed on Feb. 16, 2005, the entire contents of which is incorporated herein by reference.

FIELD OF THE INVENTION

The present invention relates to a method and system for managing destination addresses. In particular, the present invention relates to a method for and system for managing and downloading destination addresses to a mobile device having limited resources, for example in terms of memory and/or bandwidth, based on one or more variable attributes of the destination address.

BACKGROUND OF THE INVENTION

As known in the art, Instant Messaging (IM) services such as AIM and ICQ, amongst others, allow a user to maintain a contact list (or buddy list) comprising the destination addresses of other users they may wish to interact with. A user is alerted when another user matching one of the entries in his contact list goes online, and a real-time exchange of messages can take place with any of these users provided they are currently online (present) and not otherwise busy. In one embodiment of an IM service, initiating sending a message to a user opens up a small window, or dialog box, through which both users can interact in real-time by typing in text.

IM services, as are the majority of open distributed applications, are often based on a client-server architecture, where a large number of clients, typically in the form of software modules located on devices being used by individual users (such as a personal computer, PDA or the like) communicate with one or more centralised servers. The server typically responds only to requests for services which are initiated by the client. In this regard, the client will initiate establishment of a (logical) communications channel with the server by "logging on", and once established bidirectional communications can take place between client and server. In particular, once a communications channel has been established between the server and a client, the channel can be taken advantage of for the transfer of relevant IM service information. As stated above, one type of information provided and managed by IM services is contact lists.

For IM services which are implemented using personal computers and high speed wired or wireless networks, arbitrarily long contact lists may be used without any significant impact on system performance. Additionally, the attributes (or status) of individual entries in the contact list typically change over time as users come online or go offline, become engaged with other users, etc. In order to support the display of arbitrarily long contact lists and maintain currency of the displayed information, sizeable display capabilities, large available memory and frequent signaling are required. In wireless networks, where the constraints on device capabilities and network capacity are more severe, storing and maintaining status information for arbitrarily large lists of destination addresses is much more challenging.

IM services typically additionally allow a user to group contacts into smaller subsets of lists (co-workers, buddies, etc.) for easier manipulation. Existing wireless mobile instant messaging systems allow the user to create a specific contact list for usage on a mobile device. For example, U.S. Pat. No. 6,714,793 for a "method and system for instant messaging across wireless networks and a public data network", the entire contents of which is incorporated herein by reference, describes a communications system for sending a message from a wireless device over a wireless communication network. The disclosed method allows for use of destination addresses that were previously stored on the device. The method also allows the user to add new destination addresses via the device handset, but does not allow additional addresses to be collected from the communications network.

Similarly, the Open Mobile Alliance (OMA) Wireless Village Standard allows for the mobile device to request the network to supply a contact list of destinations addresses using the ListManageRequest primitive. However, no mechanism is provided for limiting the size of a contact list, for example by requesting less than the complete contact list. Furthermore, there is no mechanism for allowing the server to interactively modify the content of a contact list located at a client device during a session. The Wireless Village Standard allows for the user to modify the contact list content using the ListManageRequest, but this again does not allow for dynamic management on the part of the server to modify the content of the contact list.

Mobile devices usually contain an address book (AB), where the user may enter phone numbers of contacts. This address book may also include additional fields such as email addresses. However, these address books do not include fields for destination addresses for instant messaging contacts. As a result, there is no mechanism for associating instant messaging destination addresses with other identities in the mobile device (e.g. with the information in the device address book).

SUMMARY OF THE INVENTION

As stated above, systems providing IM services provide for a list of destination addresses (contact lists or buddy lists). These lists furthermore show the presence status (or attributes) of the user identified by the destination addresses.

A mechanism for truncating the list size is required, as well as a mechanism for updating the list on the mobile client device. In particular, in wireless networks, the problem of updating such lists is further compounded by the fact that users typically require access to their IM service for extended periods of time, during which the presence status of the destination addresses may change repeatedly. In one embodiment, the proposed mechanism provides for more efficient use of network resources by updating contact lists only when the underlying IM service is actively in use on the client device and when the changes are sufficient to impact usability. The proposed mechanism also takes into consideration that there are variations in capabilities of client devices and transport mechanisms.

In order to overcome the above and other drawbacks, a first part of the present invention relates to the management of a set of destination addresses and the status of the users identified by these destination addresses for instant messaging clients, in particular on mobile devices.

There is provided a method for downloading destination addresses associated with a given client device from a server to the client device. The method comprises the steps of determining a resource limitation of the client device, sorting the addresses, and transmitting a subset of the sorted addresses from the server to the device, wherein the transmitted sorted address subset is determined by the resource limitation.

There is also provided a system for providing Instant Messaging (IM). The system comprises a telecommunications network interconnecting a plurality of IM clients and an IM server, the plurality of IM clients configured to exchange instant messages with one another via the telecommunications network and the IM server, each of the IM clients having an associated IM address, the IM server comprising a memory for storing a plurality of IM addresses, a set of the IM addresses corresponding to each of the IM clients and wherein a given set comprises at least one IM address other than an IM address of the IM client to which the given set corresponds, wherein on occurrence of a triggering event associated with a particular IM client the IM server selects a subset of the IM addresses from the set of addresses corresponding to the particular IM client based on a resource limitation of the particular IM client and transmits the selected IM address subset to the particular IM client.

Additionally, there is provided a server in a system comprising a telecommunications network interconnecting a plurality of Instant Messaging (IM) clients with the server, each of the IM clients having an associated IM address. The server comprises a memory for storing a plurality of IM addresses, a set of IM addresses corresponding to each of the IM clients and wherein a given set of IM addresses comprises at least one IM address other than an IM address of the IM client to which the given set corresponds, wherein on occurrence of an event associated with a particular IM client the server selects a subset of IM addresses from the set of addresses corresponding to the particular IM client based on a resource limitation of the particular IM client and transmits the selected IM address subset to the particular IM client.

Additionally, the present invention relates to the management of users identified by multiple destinations addresses.

In systems providing IM services, users are frequently identified by specific destination addresses or identifiers within the system. These users may also be known through other identities in the mobile devices, such as their name, nick name, telephone number or e-mail address. There is currently no mechanism available by which the identity of a user in a system providing IM services can be associated with other identities that the same user has elsewhere in a mobile device for retrieval/storage of the IM destination address from/to another identity associated with the user, or another identity from/to the IM destination address.

In order to overcome the above and other drawbacks, a second part of the present invention provides for a method for handling user identifiers in a client device associated with a user and configured for providing communication between the user and a plurality of other users via an IM service and at least one additional communication service, the IM service comprising an IM server, each of the users identified by a unique IM identifier and at least one additional identifier uniquely identifying each of the users when using the at least one additional communication service. The method comprising the steps of providing a memory, storing a plurality of additional identifiers in the memory, receiving a contact list from the IM server, the list comprised of at least one entry comprising an IM identifier and at least one additional identifier, and for each entry in the contact list, comparing the received at least one additional identifier with the stored additional identifiers, selecting one of the stored additional identifiers which matches the received at least one additional identifier and associating the IM identifier with the selected stored additional identifier.

Additionally, there is provided a method for communicating between a user and another user, the user connected with the other user via a plurality of telecommunication services including an IM service. The method comprises the steps of receiving an IM message from the other user via the IM service, prompting the user to select one telecommunication service from the plurality of telecommunication services for responding to the received IM message, and transmitting a response to the other user using the selected telecommunication service.

Additionally, although the description of the systems, devices and methods hereinbelow is within the context of a mobile IM service, they also apply more generally to services where:

? The user is presented with a set of destination addresses. Due to the constraints of the terminal device, this set of addresses may require significant compression if it is to be displayed or stored on a mobile device, as compared to when displayed on a PC device;

? the destination addresses possess dynamic attributes that are relevant as discrimination criteria for compressing the set, and are susceptible to change while the user is accessing and using the service; or ? the user accesses and makes use of the service for periods of sufficient duration for significant changes to occur in the status of the dynamic attributes of the destination addresses.

Especially when one or more of these conditions is present, the systems, devices and methods described in hereinbelow by way of an illustrative embodiment thereof enable a compressed set of destination addresses to be initially provided to the mobile device based on relevant dynamic (variable) attributes of the destination addresses, and to be subsequently updated based on the changes in the status the dynamic (variable) attributes. As a first example, these methods could be applied to a Push-To-Talk (PTT) service, in which the compression of the set of destination addresses provided to the mobile device would be based on the availability of the destination addresses for engaging in a PTT call, and not already engaged in another call. As a second example, these methods could be applied to a gaming service, in which the compression of the set of destination addresses provided to the mobile device would be based on the availability of the destination addresses for engaging in the game, and not already playing another game.

BRIEF DESCRIPTION OF THE DRAWINGS

FIG. 3 is a flowchart of a method for managing a set of destination addresses stored on a mobile device.

DETAILED DESCRIPTION OF THE ILLUSTRATIVE EMBODIMENTS

Figure 1:
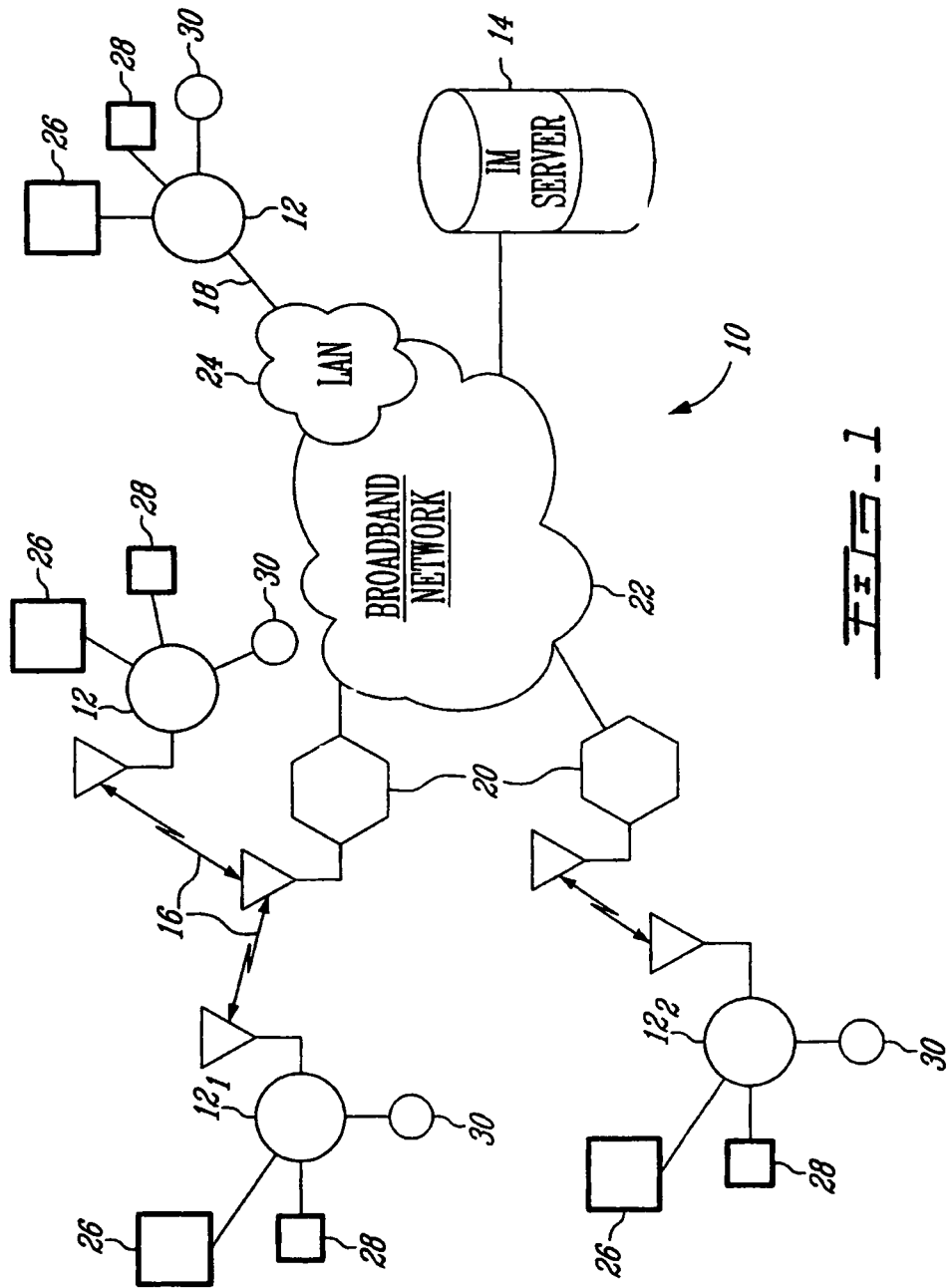
FIG. 1 is schematic diagram of an instant messaging system in accordance with an illustrative embodiment of the present invention.

Referring now to FIG. 1, a system for managing contact addresses, generally referred to using the reference numeral 10, and in accordance with an illustrative embodiment of the present invention will be described. The system 10 comprises a plurality of clients as in 12 which are arranged for communication with one or more IM servers as in 14 in a client-server relationship. In this regard, communication pathways between individual clients, for example between client $12_1$ and client $12_2$, are established via the server(s) 14. Communication bearer links, or transport, between clients and server can be supported by a variety of communications means, for example wireless connections 16 or wired connections 18, and typically consist of a concatenation of heterogeneous communication systems, such as mobile operator networks 20, broadband networks 22 such as the Internet and local area networks (LANs) 24, etc. . . . As a result, the clients as in 12 may be either mobile, for example in the form of a software module executing in a mobile client device (such as a mobile handset or the like), or fixed, for example in the form of a software module executing in a fixed client device (such as a desk top system or the like).

Figure 2:
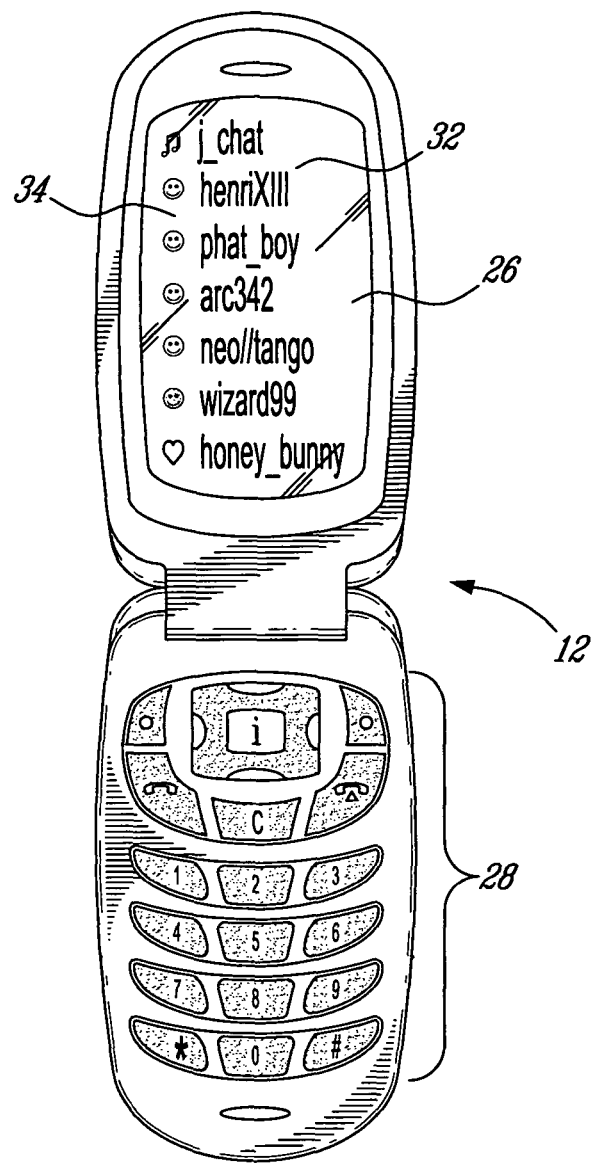
FIG. 2 is a front view of a mobile client device in accordance with an illustrative embodiment of the present invention.

Referring to FIG. 2 in addition to FIG. 1, each client as in 12 is further combined in the client device with a user interface comprised of a display 26 and an input device 28, such as a keyboard, touch screen, mouse, etc. Additional items, typically in the form of a software application, such as a client device address book 30 are also provided in particular embodiments.

Referring now to FIG. 3 in addition to FIGS. 1 and 2, an illustrative embodiment of a mechanism for managing the set of destination addresses stored on a mobile device will now be described with reference to the flowchart.

When presented with a contact list comprised of a set of destination addresses to be downloaded to a client 12, the server 14 determines the size suitable for the client 12 and the transport being used ('*1' in the flowchart). The client capabilities, or resource limitations, may be previously known to the server 14 for example, based on a number of preset configurations stored in memory), or may be supplied by the client 12 at the time that the request to download the contact list of destination addresses is made. Alternatively, the server 14 may determine, for example based on the type of transport (for example, SMS), that the list must be fixed at a certain predetermined limit (for example, thirty (30) destination addresses).

If the number of destination addresses in a contact list is greater than allowed for a particular client 12 or transport, the system selects which subset will be sent to the client 12 ('*2' in the flowchart). For example, referring now to FIG. 2, to provide a visual indication to the user, each destination address as in 32 is typically tagged with a descriptive icon as in 34 indicating the current presence status (or variable attribute) of the user identified by that particular destination address 32. Typically, presence status indicates one of "online", "busy", "away", or "offline". In an illustrative embodiment, the destination addresses 32 in the contact list would be prioritized according to their presence status and those addresses whose presence status indicates that they are "online" would be downloaded first, followed by destination addresses whose presence status indicates that they are "busy", "away", etc., until the maximum number of destination addresses is reached.

Referring back to FIGS. 1 and 3 in addition to FIG. 2, as the presence status of the destination addresses change over time (e.g. from "offline" to "online"), a mechanism is provided for refreshing the set of destination addresses 32 in the client 12. A number of different triggers may be used ('*3' in the flowchart). For example, one trigger may be that the user manually refreshes the set by selecting via the input device 28 a menu entry which is displayed to the user in the display 26, triggering an action in the client 12. Alternatively, the server 14 could detect that it is an appropriate time to send an updated set of destination addresses 32 to the client 12 such as the expiry of a predetermined time delay or a change in state of one of the destination addresses as in 24. For example, using the Wireless Village protocol as a basis (with the addition of an extension to the "ListManage" primitive to indicate a dynamic update of the destination addresses), a manual refresh may be generated using the "ListManage" primitive. Alternatively, another method would allow the server 14 to include the set of destination addresses 32 (or update to the set) during a presence update. This could be accomplished with the addition of an appropriate extension to the Wireless Village primitives GetPresence or PresenceNotification.

Once the server 14 has detected a trigger to dynamically update the set of destination addresses 32, the server 14 must again select which subset will be sent to the client 12 ('*4' in the flowchart). As the client 12 is currently in a session, there may be one or more destination addresses having a presence status indicating "in conversation". In this example, an illustrative embodiment of selecting the subset of destination addresses 32 would be to prioritize them in the order "in conversation", "online", "busy", "away", or "offline" and download those destination addresses 32 having presence status indicating "in conversation" first, followed by "online", "busy", "away", and "offline" up until the maximum number of destination addresses has been downloaded.

In an alternative embodiment, the entire contact list could be divided into a series of smaller contact lists, each of the smaller contact lists comprising a subset of all those destination addresses which would otherwise form part of the contact list. Provision would also be made to allow the user to view the smaller contact lists one list at a time. For example, the default contact list may include all destinations addresses where the presence status indicates "online", with subsequent contact lists containing the remaining destination addresses arranged, for example, alphabetically. Illustratively, the client 12 would retrieve the identities of the set of smaller contact lists with the Wireless Village primitive GetListRequest. The default list could then be retrieved using the ListManageRequest primitive. The user would then be presented with the option to view the other lists (e.g. using a "next page" command or the like). When selected, the client would use the ListManageRequest primitive with reference to the subsequent contact list identifier (Contact-List-ID) to download the next in the series of smaller contact lists.

Referring now back to FIGS. 1 and 2, on login to an IM service for example, the server 14 provides to the client 12, typically in the form of a contact list (not shown) associated with the user of the client 12, one or more attributes associated with those destination addresses as in 32 in the contact list. These attributes can include, for example, a plurality of identifiers such as the destination address in the IM service (User ID), contact name, nick name as well as identifiers identifying a given user on other communication systems, as email address(es), telephone number(s), etc. In an alternative embodiment of the present invention the client 12 inspects the device address book 30 together with the contact list to determine if some of these identifiers match with equivalent identifiers of entries stored in the device address book 30. Upon positive match, the client 12 associates the destination address 32 with the corresponding entry stored within the device address book 30. This association can be automatic, or alternatively could require confirmation from the user.

The IM service may also offer the user the ability to manually associate a destination address 32 with an entry stored within the device address book 30 (for example, the client 12 could prompt the user the option of selecting an entry in the device address book 30 and linking the destination address 32 to the entry). Once this association is made, the user is provided with the option of communicating with a particular destination address via a means other than the IM service. For example, the user may select to transmit an e-mail message or to phone the other user identified by that destination address.

Alternatively, the association could be stored by the client 12 within the device address book 30 following which the device address book 30 could be used by the to user to send instant messages to the user identified by the entry in the device address book 30.

Although the present invention has been described hereinabove by way of an illustrative embodiment thereof, this embodiment can be modified at will without departing from the spirit and nature of the subject invention.

What is claimed is:

1. A method, comprising:
   retrieving a contact list for a client device using one or more servers, the contact list comprising a plurality of addresses for a corresponding plurality of contacts corresponding to a plurality of users, and wherein each address has a corresponding presence attribute indicating a current status of the corresponding contact;
   determining a resource limitation of the client device by the one or more servers;
   sorting, at least in part, the addresses for a plurality of users according to their corresponding presence attributes, by the one or more servers;
   transmitting, at least in part, a subset of the sorted addresses to the client device by the one or more servers, wherein the transmitted subset is determined based on the resource limitation; and
   wherein the sorting the addresses further comprises prioritizing the addresses for a plurality of users according to their corresponding presence attributes, and
   the transmitting a subset further comprises transmitting a subset of prioritized addresses for a corresponding plurality of users from the one or more servers to the client device in order of their priority.

2. The method of claim 1, wherein: the current status of a contact may be an online status, and the transmitted subset comprises addresses that have an online presence attribute.

3. The method of claim 1, wherein: the current status of a contact may be one of a plurality of different statuses selected from the group consisting of online, busy, away and offline, and the sorting of the addresses comprises, at least in part, a prioritizing of addresses having an online presence attribute as highest, addresses having a busy presence attribute as second highest, addresses having an away presence attribute as third highest and addresses having an offline presence attribute as lower.

4. The method of claim 1, wherein the client device and the one or more servers are interconnected via at least one wireless communications transport and the resource limitation is a speed of the wireless communications transport.

5. The method of claim 1, wherein the client device comprises a memory allocated for storing a received message, and the resource limitation is a number of messages configured to be stored in the memory.

6. The method of claim 1, wherein the client device comprises a memory allocated for storing the transmitted subset, and the resource limitation is a number of addresses configured to be stored in the memory.

7. The method of claim 1 further comprising: updating the transmitted subset when the corresponding presence attribute of at least one of the addresses changes.

8. The method of claim 1, further comprising updating, at least in part, of the transmitted subset periodically.

9. The method of claim 7, wherein: the updating further comprises sorting the addresses according to their corresponding presence attributes and transmitting a subset of the sorted addresses from the one or more servers to the client device, and the transmitted sorted subset is determined by the resource limitation.

10. The method of claim 1, wherein the sorted addresses of the transmitted subset have a common corresponding presence attribute.

11. The method of claim 1, wherein the resource limitation is that each address of the transmitted subset has the same corresponding presence attribute.

12. The method of claim 1, further comprising: providing a plurality of predefined client device types prior to determining the resource limitation, each of the predefined client device types comprising at least one predetermined resource limitation, wherein determining the resource limitation comprises identifying a type of the client device and correlating the identified type with one of the predefined client device types.

13. The method of claim 1, further comprising: logging in of the client device into the one or more servers prior to determining the resource limitation, wherein the at least one resource limitation is provided by the client device to the one or more servers during the logging in.

14. The method of claim 13, further comprising: providing a plurality of predefined client device types, each of the predefined client device types comprising at least one predetermined resource limitation, wherein: the logging in comprises the client device providing a client device type to the one or more servers, and the determining the resource limitation comprises correlating the provided client device type with one of the predefined client device types.

15. The method of claim 1, wherein a number of addresses in the transmitted subset of prioritized addresses is determined based on the resource limitation.

16. The method of claim 15, wherein the client device and the one or more servers are interconnected via at least one wireless communications transport and the resource limitation is a speed of the wireless communications transport.

17. The method of claim 15, wherein the client device comprises a memory allocated for storing a received message, and the resource limitation is a number of messages configured to be stored in the memory.

18. The method of claim 15, wherein the client device comprises a memory allocated for storing the transmitted subset, and the resource limitation is a number of addresses configured to be stored in the memory.

19. A server computer, comprising:
   a memory for storing a contact list for a client device, the contact list comprising a plurality of addresses for a corresponding plurality of contacts corresponding to a plurality of users, and wherein each address has a corresponding presence attribute indicating a current status of the corresponding contact;
   a transmitter for transmitting at least a portion of the plurality of addresses to the client device;
   a processor coupled with said memory and with said transmitter, for determining a resource limitation of the client device, sorting the addresses of a plurality of users according to their corresponding presence attributes, and causing said transmitter to transmit a subset of the sorted addresses to the client device, wherein the transmitted subset is determined based on the resource limitation; and
   wherein said processor sorts the addresses by prioritizing the addresses for a plurality of users according to their corresponding presence attributes, and wherein said processor causes said transmitter to transmit a subset of prioritized addresses for a corresponding plurality of users to the client device in order of their priority.

20. The server computer of claim 19, wherein the current status of a contact may be an online status, and wherein the transmitted subset comprises addresses that have an online presence attribute.

21. The server computer of claim 19, wherein the current status of a contact may be one of a plurality of different statuses selected from the group consisting of online, busy, away and offline, and wherein said processor sorts the addresses by prioritizing addresses having an online presence attribute as highest, addresses having a busy presence attribute as second highest, addresses having an away presence attribute as third highest and addresses having an offline presence attribute as lower.

22. The server computer of claim 19, wherein the client device is connected to the server computer via at least one wireless communications transport, and wherein the resource limitation is a speed of the wireless communications transport.

23. The server computer of claim 19, wherein the client device includes a memory for storing received messages, and wherein the resource limitation is a number of messages configured to be stored in the client memory.

24. The server computer of claim 19, wherein the client device includes a memory for storing the transmitted subset, and the resource limitation is a number of addresses configured to be stored in the memory.

25. The server computer of claim 19 wherein said processor updates the transmitted subset when the corresponding presence attribute of at least one of the addresses changes.

26. The server computer of claim 25, wherein said processor updates the transmitted subset by sorting the addresses according to their corresponding presence attributes, wherein said processor causes said transmitter to transmit a subset of the sorted addresses to the client device, and wherein the transmitted sorted subset is determined by the resource limitation.

27. The server computer of claim 19, wherein said processor periodically updates the transmitted subset.

28. The server computer of claim 19, wherein the sorted addresses of the transmitted subset have a common corresponding presence attribute.

29. The server computer of claim 19, wherein the resource limitation is that each address of the transmitted subset has the same corresponding presence attribute.

30. The server computer of claim 19, wherein said memory stores a plurality of predefined client device types, each of the predefined client device types comprising at least one predetermined resource limitation, and wherein said processor determines the resource limitation by identifying a type of the client device and correlating the identified type with one of the predefined client device types.

31. The server computer of claim 19, wherein said processor causes a logging in of the client device to the server computer prior to determining the resource limitation, and wherein the at least one resource limitation is provided by the client device to the server computer during the logging in.

32. The server computer of claim 31, wherein said memory stores a plurality of predefined client device types, each of the predefined client device types comprising at least one predetermined resource limitation, wherein the client device provides a client device type to the server computer after logging in thereto, and wherein said processor determines the resource limitation by correlating the provided client device type with one of the predefined client device types.

33. The server computer of claim 19, wherein a number of addresses in the transmitted subset of prioritized addresses is determined based on the resource limitation.

34. The server computer of claim 33, wherein the client device is connected to the server computer via at least one wireless communications transport, and wherein the resource limitation is a speed of the wireless communications transport.

35. The server computer of claim 33, wherein the client device includes a memory for storing received messages, and wherein the resource limitation is a number of messages configured to be stored in the client memory.

36. The server computer of claim 33, wherein the client device includes a memory for storing the transmitted subset, and the resource limitation is a number of addresses configured to be stored in the memory.

* * * * *